C. A. HAAS.
CHECK VALVE FOR PNEUMATIC TIRES.
APPLICATION FILED AUG. 26, 1910.
1,050,942.
Patented Jan. 21, 1913.
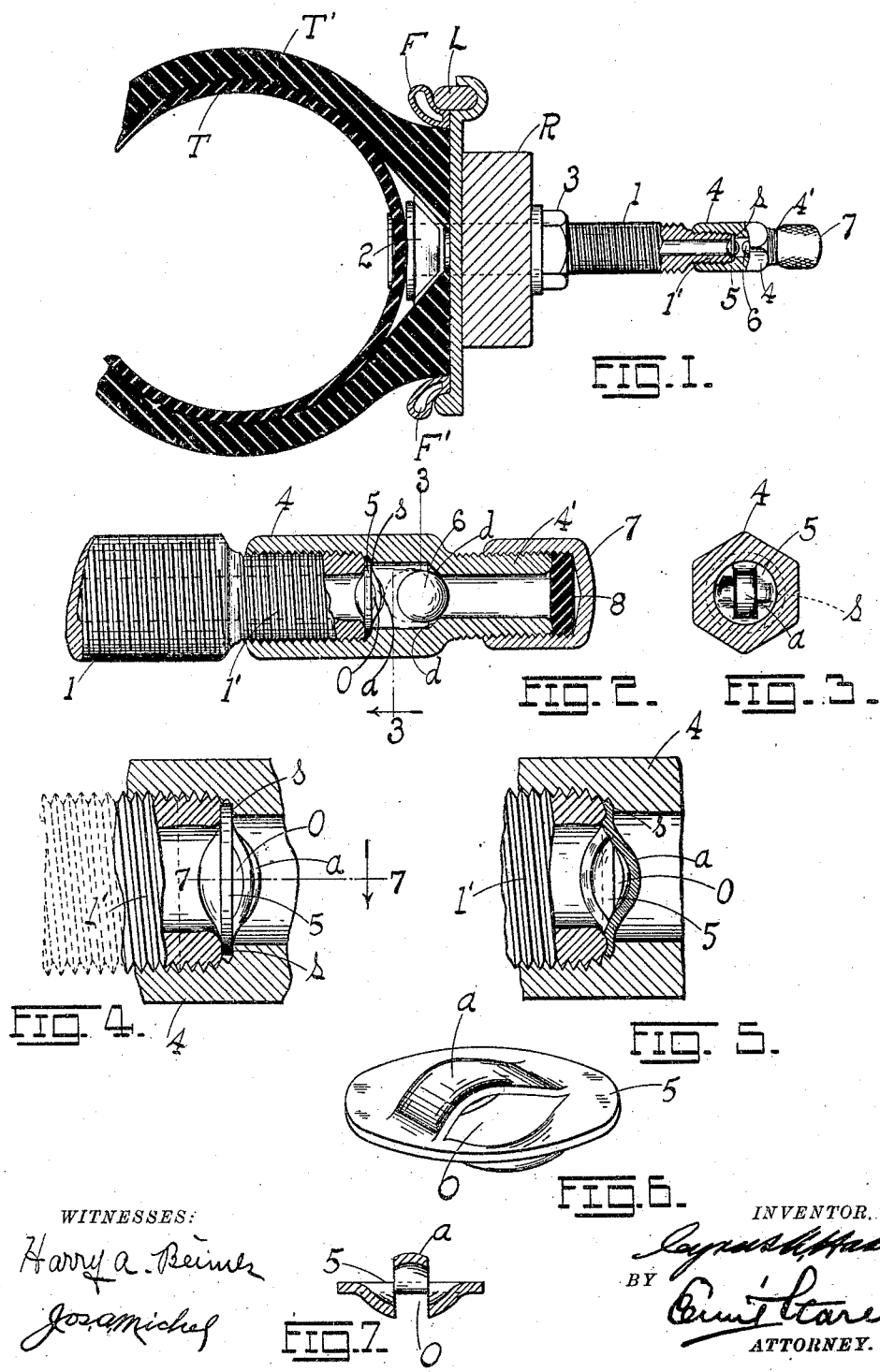
WITNESSES:
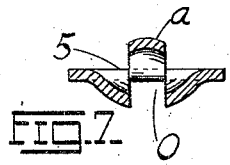
INVENTOR.
BY
ATTORNEY.

UNITED STATES PATENT OFFICE.

CYRUS A. HAAS, OF ST. LOUIS, MISSOURI.

CHECK-VALVE FOR PNEUMATIC TIRES.

1,050,942.   Specification of Letters Patent.   Patented Jan. 21, 1913.

Application filed August 26, 1910. Serial No. 579,118.

*To all whom it may concern:*

Be it known that I, CYRUS A. HAAS, a citizen of the United States, residing at St. Louis, State of Missouri, have invented certain new and useful Improvements in Check-Valves for Pneumatic Tires, of which the following is a full, clear, and exact description, reference being had to the accompanying drawings, forming a part hereof.

My invention has relation to improvements in check-valves for pneumatic tires; and it consists in the novel construction of valve more fully set forth in the specification and pointed out in the claims.

In the drawings, Figure 1 is a cross-section of a pneumatic tire (broken away) and supporting rim, showing my check-valve applied thereto; Fig. 2 is an enlarged middle longitudinal section of the valve; Fig. 3 is a cross-section on the line 3—3 of Fig. 2; Fig. 4 is an enlarged sectional detail of the valve-casing and valve-stem engaging the gasket which arrests the valve, the casing not being fully driven home; Fig. 5 is a similar view with casing driven its full limit, and showing the edge of the gasket squeezed behind the threads of the valve-stem; Fig. 6 is a detached perspective of the gasket; and Fig. 7 is a cross-section on the line 7—7 of Fig. 4.

The object of my invention is to provide the prevailing form of automobile or other pneumatic tire with a check-valve attachment which will make easy the work of inflation, consuming a minimum amount of energy on the part of the operator by whom, or the motor by which the pump inflating the tire may be actuated.

A further object is to construct a valve which will be simple, readily attachable to prevailing tires, one which shall be cheap, durable, light, air-tight, requiring no leading; one provided with a special metallic gasket which is forced to its seat within the valve-casing by the outer end of the valve-stem leading from the inflatable section of the tire; one provided with a large air passage for the free influx of air into the tire; one made of a minimum number of parts; one in which the gasket remains permanently on its seat, special provision being made at the outer ends of the screw-threaded portion of the valve-stem to force the gasket edges around the threads of such stem; one insuring a permanent joint whenever the valve-casing is screwed to the valve-stem; and one possessing further and other advantages better apparent from a detailed description of the invention, which is as follows:—

Referring to the drawings, T represents the inner inflatable tube, and T' the outer section as well understood in the art. In the present illustration is shown a wooden felly R to which the rubber section T' is secured by the locking ring L, the outside removable flange F and the inside removable flange F' as shown being common constructions in the art. With these my invention is not immediately concerned. In the prevailing forms of pneumatic tires, there is present the valve-stem 1 terminating at its inner end in a flaring head or mouth 2 which is in communication with the inflatable tire section T, the stem being exteriorly screw-threaded and carrying a lock-nut 3 by which the head 2 is drawn firmly against the edges of the outer envelop or section T'. The outer reduced stem or nipple 1' in the prevailing constructions carries a check-valve which in the present case is omitted and in lieu thereof there is substituted the check-valve attachment forming the subject matter of the present invention.

The invention consists of a valve-casing 4 screw-threaded on the interior so as to screw over the nipple 1' as shown (Fig. 1) that threads in the casing terminating at the annular shoulder or seat *s* formed at the base of the threads. The casing 4 is provided with a circular metallic disk or gasket 5 (preferably of copper) from which is stamped or slit a central bridge-piece or abutment *a* which is not only bowed outwardly or toward the ball-valve 6 confined in the casing, but is at the same time transversely arched thus presenting a section of substantially a spherical surface to the valve when the latter is arrested by said bridge-piece during the act of inflation. Opposite the member *a*, the body of the disk 5 is bowed inwardly which thus imparts a dish-shaped configuration to the central portion of the disk, the outer portions of which rest on the annular shoulder *s* referred to. A seat *d* is formed for the valve 6 at the base of the reduced exteriorly screw-threaded stem or neck 4' forming the outer terminal of the valve-casing 4 over which neck the end of the hose (not shown) leading from any available air-pump is passed during the inflating operation as well understood in the art. When the inflation is complete, the compressed air within the tire drives the check-valve 6 against the conical seat $d$, and the neck 4' is closed by a valve-cap 7 preferably provided with a compressible packing disk 8 at the bottom thereof for engaging the end of the neck (Fig. 2). During the inflating operation the inflowing air unseats the valve 6 forcing it against the bridge-piece or abutment $a$ (which it engages centrally at practically a single point of contact by virtue of the contour of said bridge-piece), the air freely passing the gasket or disk 5 (as a result of the bowing of the member $a$) as clearly obvious from the drawing, the dotted position of the valve in Fig. 2 showing the valve unseated. The casing 4 is preferably polygonal on the outside so it can be readily manipulated by the hand or wrench and driven home on the stem 1 where it remains as a permanent attachment to the wheel.

It will be observed from Figs. 4 and 5, that the bore of the casing 4 just above the shoulder $s$ is somewhat tapered so that when the cylindrical nipple 1' of the valve stem 1 is driven home, the taper of the bore referred to will compress the walls of the nipple and effect a very tight joint, thus dispensing with leading or any packing whatsoever. The nipple in being driven home squeezes the outer edges of the gasket 5 well into the spaces between the threads in the casing 4 making a double joint, that is to say, a joint with the threaded portions of both the parts 1' and the screw-threads of the casing 4. Before the gasket 5 is thus squeezed it occupies the position represented in Fig. 4, but after the parts are driven home, the result is more on the order represented in Fig. 5. The bowing of the abutment $a$ toward the valve 6 and the dishing of the main body of the gasket in the opposite direction results in the formation of a maximum opening O for the influx of the air; and the transverse arching of the abutment or bridge-piece $a$ (Fig. 7) imparts to the latter a substantially spherical curvature the center of which is engaged by the valve 6 when the latter is unseated (Fig. 2 dotted position). The valve thus contacts with the abutment $a$ at the center, allowing the inflowing air to pass freely around the valve through the opening O and into the tire T. In practice the area of the opening O should correspond to the cross-sectional areas of the passage-ways of the valve-stem 1, 1', and of the neck 4' of the casing 4 respectively, and the area of the annular clearance between the valve 6 and the inner wall of that portion of the casing 4 within which the valve is confined (between the seat $d$ and the shoulder $s$) should likewise conform to the areas of the respective cross-sections, of the neck 4', stem 1, 1', and of the opening O. In other words the cross-sectional areas of the passage-ways of the several elements which the air must traverse should correspond to one another, so that no obstruction be offered to the inflating current.

To inflate the tire, the valve-cap 7 is removed, the hose conducting the compressed air is attached to the stem 4', the current unseating the valve 6 driving it against the abutment $a$, the inflating current flowing without obstruction into the tire T. When the operation is complete the compressed air drives the valve 6 against its seat $d$; after this the cap 7 is restored to its position on the stem 4' sealing the air. The tight joint made by the gasket 5 resting on the shoulder $s$, with its outer edge squeezed in between the threads of the parts 1' and 4, prevents any possible leakage of air from the tire into the atmosphere.

Having described my invention, what I claim is:—

1. In combination with a valve-stem, a check-valve comprising a casing coupled to said stem, and provided with a valve-seat, a spherical valve or ball normally forced to said seat under fluid pressure from the valve-stem, a centrally perforated gasket shouldered to the casing a suitable distance from the seated position of the valve, and a central abutment formed with the gasket and spanning the opening thereof for arresting the ball during inflation of the tire, the center of the abutment being opposite the center of the opening.

2. In combination with a valve-stem, a check-valve comprising a casing coupled to said stem and provided with a valve-seat, a spherical valve or ball normally forced to said seat under fluid pressure from the valve-stem, a centrally perforated gasket shouldered to the casing at a point removed from the seated position of the valve and forced to said shoulder and against the walls of the casing by the engaging end of the valve stem thereby making a tight joint, and a central abutment forming a part of the gasket and spanning the opening thereof for arresting the valve during inflation of the tire.

3. In combination with a valve-stem, a check-valve comprising a valve-casing coupled to said stem, and provided with a valve-seat, a ball valve normally forced to said seat under fluid-pressure from the valve-stem, a perforated circular gasket shouldered to the casing at a point removed from the seated position of the valve and in engagement with the outer end of the valve-stem, a central section of the gasket being bowed toward the valve and forming an abutment for the latter during the unseating thereof, the portions on each side of the abutment being dished away from the valve, whereby an opening is left in the gasket for the passage of air therethrough in either direction.

4. In combination with a valve-stem, a check-valve comprising a valve-casing coupled to said stem and terminating in an outer stem provided with an inner valve-seat, a ball-valve normally forced to said seat under fluid pressure, a gasket having an opening and provided with a central valve-abutment bridging said opening, the outer edges of the gasket engaging the outer end of the valve-stem, the cross-sectional areas of the respective passage-ways of the valve-stem and casing stem, corresponding substantially to the area of the annular passage-way around the valve, or to the area of the opening in the gasket, whereby the air is free to flow without obstruction, during inflation of the tire.

5. In combination with a valve-stem, a casing screwed over the same and provided with a valve-seat, a ball-valve normally engaging said seat, and an open dished gasket interposed between the valve and valve-stem and provided with a central bridge-piece, bowed toward the valve and forming an abutment therefor with the unseating of the valve.

6. In a check-valve, a gasket comprising a disk having a central portion bowed in one direction from the adjacent face of the disk, and dished in the opposite direction on either side of the bowed portion, an opening being thereby left in the disk for the free travel of fluid.

7. In a check-valve, a gasket comprising a disk having a permanently open central opening, the portions of the disk adjacent the opening being dished in one direction, and a bridge-piece spanning the opening between the dished portions.

In testimony whereof I affix my signature, in presence of two witnesses.

CYRUS A. HAAS.

Witnesses:
  EMIL STAREK,
  CHAS. J. GARCIA.